US006755057B2

(12) United States Patent
Foltz

(10) Patent No.: US 6,755,057 B2
(45) Date of Patent: Jun. 29, 2004

(54) DUST COVER LOCK SYSTEM FOR VEHICLE FILLER NECK

(75) Inventor: Dean C. Foltz, Shelbyville, IN (US)

(73) Assignee: Stant Manufacturing Inc., Connersville, IN (US)

( * ) Notice: Subject to any disclaimer, the term of this patent is extended or adjusted under 35 U.S.C. 154(b) by 0 days.

(21) Appl. No.: 10/287,252

(22) Filed: Nov. 4, 2002

(65) Prior Publication Data

US 2004/0083779 A1 May 6, 2004

(51) Int. Cl.[7] .............................................. B65D 55/14
(52) U.S. Cl. .......................... 70/159; 70/171; 220/86.2; 141/312
(58) Field of Search ........................... 70/159, 173.455; 220/86.2; 141/348, 312

(56) References Cited

U.S. PATENT DOCUMENTS

| 1,902,456 A | * | 3/1933 | Matthews |
| 2,109,137 A | * | 2/1938 | Marsh ......................... 292/201 |
| 2,247,509 A | * | 7/1941 | Lebus ............................ 220/86 |
| 2,503,031 A | * | 4/1950 | Davidson ....................... 220/35 |
| 2,931,207 A | * | 4/1960 | Fisher ............................ 70/181 |
| 3,911,977 A | * | 10/1975 | Berger ......................... 141/348 |
| 3,930,388 A | * | 1/1976 | Barras ............................ 70/159 |
| 4,030,322 A | * | 6/1977 | Pettit .............................. 70/159 |
| 4,091,959 A | * | 5/1978 | O'Banion ..................... 220/304 |
| 4,424,839 A | * | 1/1984 | Otani et al. .................. 141/348 |
| 4,651,889 A | * | 3/1987 | Uranishi et al. ............ 220/85 VR |
| 4,702,386 A | * | 10/1987 | Boehmer et al. ........... 220/86 R |
| 4,715,509 A | * | 12/1987 | Ito et al. .................... 220/86 R |
| 4,747,508 A | * | 5/1988 | Sherwood .................. 220/86 R |
| 4,762,247 A | * | 8/1988 | Temmesfeld ................. 220/303 |
| 4,946,060 A | * | 8/1990 | Sherwood et al. ......... 220/86.2 |
| 4,966,299 A | * | 10/1990 | Teets et al. ............. 220/85 VR |
| 4,986,439 A | * | 1/1991 | Ott et al. ..................... 220/334 |
| 5,056,570 A | * | 10/1991 | Harris et al. .................. 141/59 |
| 5,195,566 A | * | 3/1993 | Ott et al. ..................... 141/312 |
| 5,271,438 A | * | 12/1993 | Griffin et al. ................. 141/59 |
| 5,322,100 A | * | 6/1994 | Buechler et al. ............ 141/312 |
| 5,467,621 A | * | 11/1995 | Gravino ........................ 70/171 |
| 5,732,840 A | * | 3/1998 | Foltz ......................... 220/86.2 |
| 6,092,685 A | * | 7/2000 | Gruber ...................... 220/86.2 |
| 6,189,581 B1 | * | 2/2001 | Harris et al. ................ 141/348 |
| 6,230,739 B1 | * | 5/2001 | Gericke ....................... 137/588 |
| 6,336,482 B1 | * | 1/2002 | Cunkle et al. .............. 141/350 |
| 6,367,520 B1 | * | 4/2002 | Palvolgyi et al. ........... 141/289 |
| 6,415,827 B1 | * | 7/2002 | Harris et al. ................ 141/348 |

* cited by examiner

Primary Examiner—Suzanne Dino Barrett
(74) Attorney, Agent, or Firm—Barnes & Thornburg

(57) ABSTRACT

A filler neck closure assembly for a vehicle fuel tank filler neck includes a filler neck closure housing adapted to be coupled to the fuel tank filler neck. The filler neck closure housing is formed to include an outer aperture sized to receive a fuel-dispensing pump nozzle therein. The assembly also includes a dust shield mounted for movement relative to the filler neck closure housing to open and close the outer aperture of the filler neck closure housing. A lock of the assembly is coupled to the filler neck closure housing and is movable between a locked position to prevent the dust shield from opening the outer aperture and an unlocked position to allow the dust shield to open the outer aperture.

27 Claims, 4 Drawing Sheets

DUST COVER LOCK SYSTEM FOR VEHICLE FILLER NECK

BACKGROUND AND SUMMARY

The present disclosure relates to a filler neck closure assembly for a vehicle fuel tank, and particularly to a filler neck closure for use in a capless fuel tank filler neck.

A removable fuel cap with a sealing gasket is typically used to close the open end of a fuel tank filler neck. After an attendant fills the fuel tank and withdraws the pump nozzle from the filler neck, the fuel cap is attached to the filler neck so that the sealing gasket forms a seal between the fuel cap and the filler neck. Thus, the fuel cap closes the open end of the filler neck to block discharge of liquid fuel and fuel vapor from the fuel tank through the filler neck. Some fuel caps are provided with pressure-relief and vacuum-relief valves to permit some controlled venting of the fuel vapors in the filler neck while the fuel cap is mounted on the filler neck.

It has been observed that fuel caps are often lost or damaged over time and, as a result, the open end of the filler neck might not be closed and sealed in accordance with original equipment specifications during operations of the vehicle. Accordingly, a filler neck configured to "open" automatically as a fuel-dispensing pump nozzle is inserted into the filler neck during refueling and "close" automatically once the pump nozzle is withdrawn from the filler neck without requiring an attendant to reattach a fuel cap to the filler neck would be an improvement over many conventional capped filler neck systems. Although conventional fuel caps function to close filler necks in a satisfactory manner, it is thought that a capless filler neck could make vehicle refueling more convenient for consumers because no action other than inserting a pump nozzle into the outer end of the filler neck would be required to begin refueling a vehicle.

According to the present disclosure, an illustrative filler neck closure assembly for a vehicle fuel tank filler neck includes a filler neck closure housing adapted to be coupled to the fuel tank filler neck. The filler neck closure housing is formed to include an outer aperture sized to receive a fuel-dispensing pump nozzle therein. The assembly also includes a dust shield mounted for movement relative to the filler neck closure housing to open and close the outer aperture of the filler neck closure housing. A lock of the assembly is coupled to the filler neck closure housing and is movable between a locked position to prevent the dust shield from opening the outer aperture and an unlocked position to allow the dust shield to open the outer aperture.

The lock includes a housing coupled to the filler neck closure housing and a lock blade movable relative to the housing between the locked position, where the lock blade is engaged with the dust shield, and an unlocked position, where the lock blade is disengaged from the dust shield. The lock housing includes a slot for receiving a portion of the lock blade therein. The lock blade moves within the slot, relative to the housing, between the engaged and disengaged positions.

The illustrative filler neck closure assembly further includes a lock actuator adapted to be coupled to the lock to move the lock blade within the slot of the lock housing between the engaged and disengaged positions. Illustratively, the lock actuator, is moved in a counterclockwise direction to disengage the lock blade from the dust shield.

The illustrative filler neck closure housing of the assembly includes a top wall to which the dust shield and lock are each coupled.

Additional features of the disclosure will become apparent to those skilled in the art upon consideration of the following detailed description of the illustrative embodiments exemplifying the best mode of carrying out the disclosure as presently perceived.

BRIEF DESCRIPTION OF THE DRAWINGS

The detailed description particularly refers to the following figures in which.

DETAILED DESCRIPTION OF THE DRAWINGS

Figure 1:
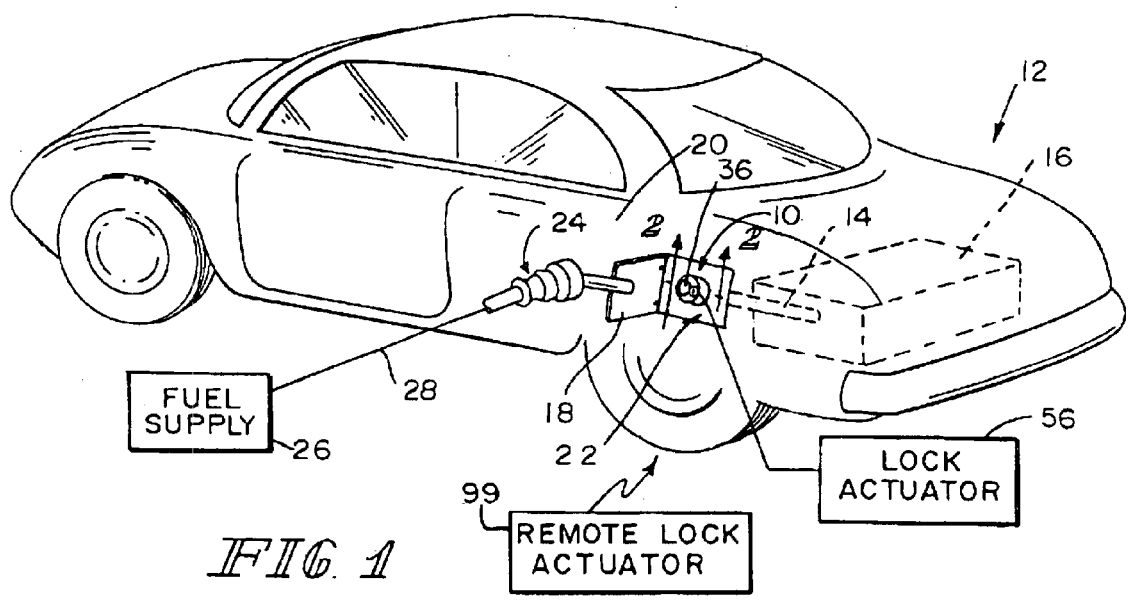
FIG. 1 is a perspective view of a vehicle showing an outer filler neck access door moved to an opened position relative to a vehicle body panel to expose a movable dust shield retained in a locked position closing a nozzle-receiving opening formed in a filler neck closure assembly coupled to a filler neck leading to a vehicle fuel tank, a lock actuator provided to unlock the dust shield so that the dust shield can be moved to an opened position as suggested in FIG. 6, and a fuel-dispensing pump nozzle coupled to a fuel supply and configured to be inserted into the filler neck closure assembly during refueling.
Figure 2:
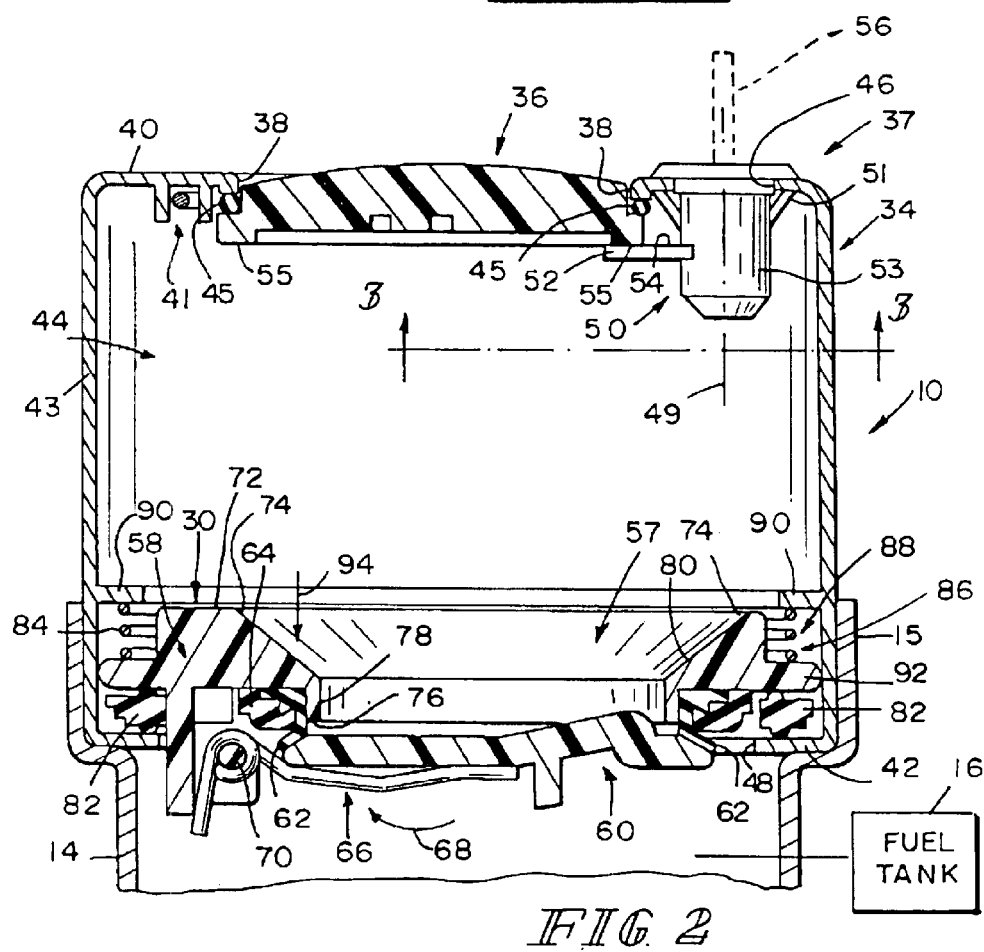
FIG. 2 is a sectional view taken along line 2—2 of FIG. 1 showing a lock blade included in a lock associated with the dust shield moved to assume a locked position blocking movement of the dust shield toward an opened position and showing (in phantom) a lock-actuator key inserted into the shield lock.

As shown in FIGS. 1 and 2, a filler neck closure assembly 10 is provided in a vehicle 12 to normally close a filler neck 14 extending from a fuel tank 16 onboard vehicle 12. During refueling, an outer filler neck access door 18 is moved relative to a vehicle body panel 20 to expose filler neck closure assembly 10, as shown, for example, in FIG. 1. Filler neck closure assembly 10 is located in a chamber 22 formed in vehicle 12 so that assembly 10 is "out of sight" when access door 18 is closed. A fuel-dispensing pump nozzle 24 is coupled to a fuel supply 26 by a hose 28 and configured to be inserted into filler neck closure assembly 10 during vehicle refueling to discharge liquid fuel into filler neck 14 as suggested in FIG. 6.

Figure 3:
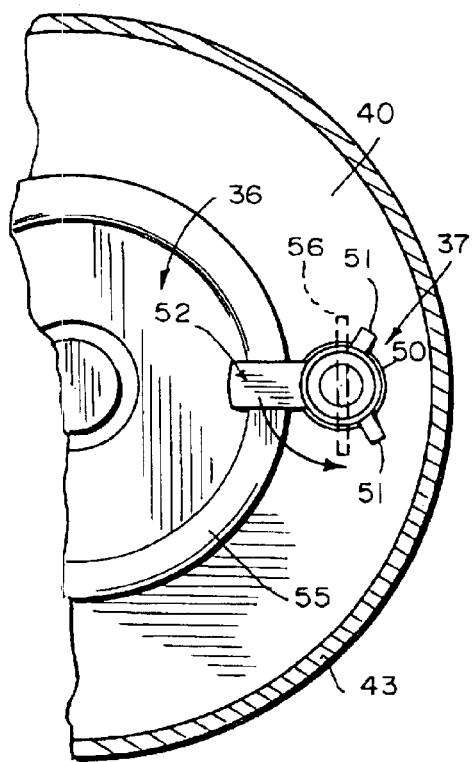
FIG. 3 is a partial view taken along line 3—3 of FIG. 2 showing the lock blade of the shield lock in the locked position and (in phantom) the lock-actuator key in a just-inserted position in the shield lock.
Figure 4:
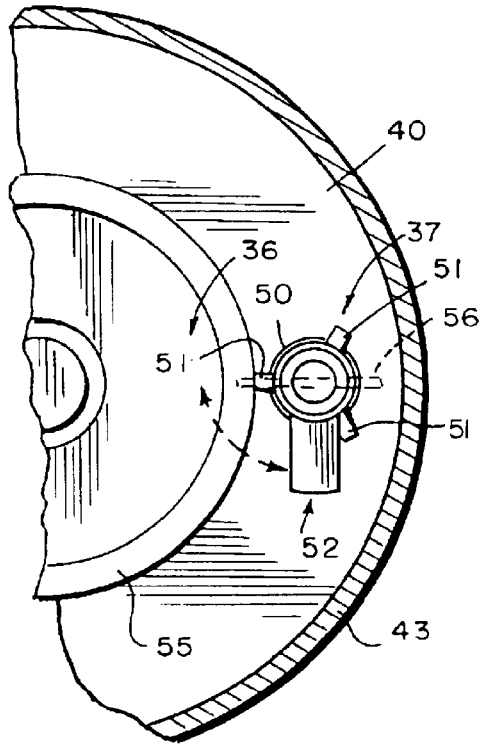
FIG. 4 is a view similar to FIG. 3 showing counterclockwise movement of the lock blade relative to the dust shield to assume an unlocked position.
Figure 5:
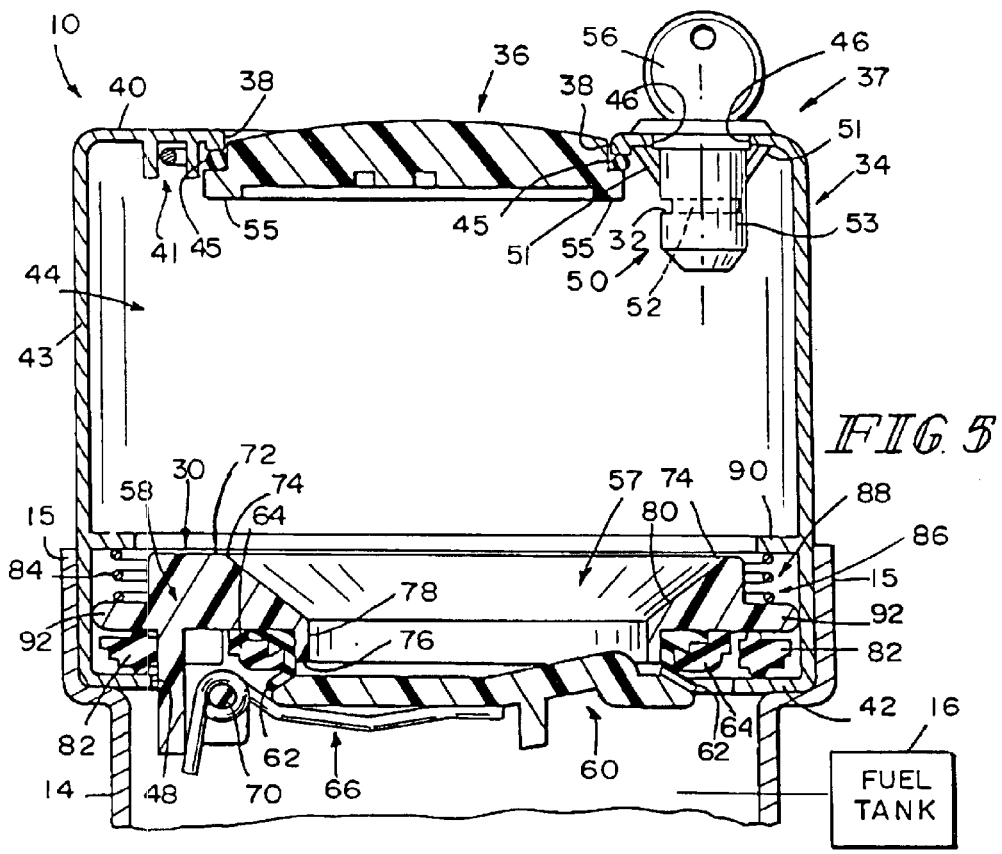
FIG. 5 is a sectional view similar to FIG. 2 showing the lock blade in the unlocked position of FIG. 5.
Figure 6:
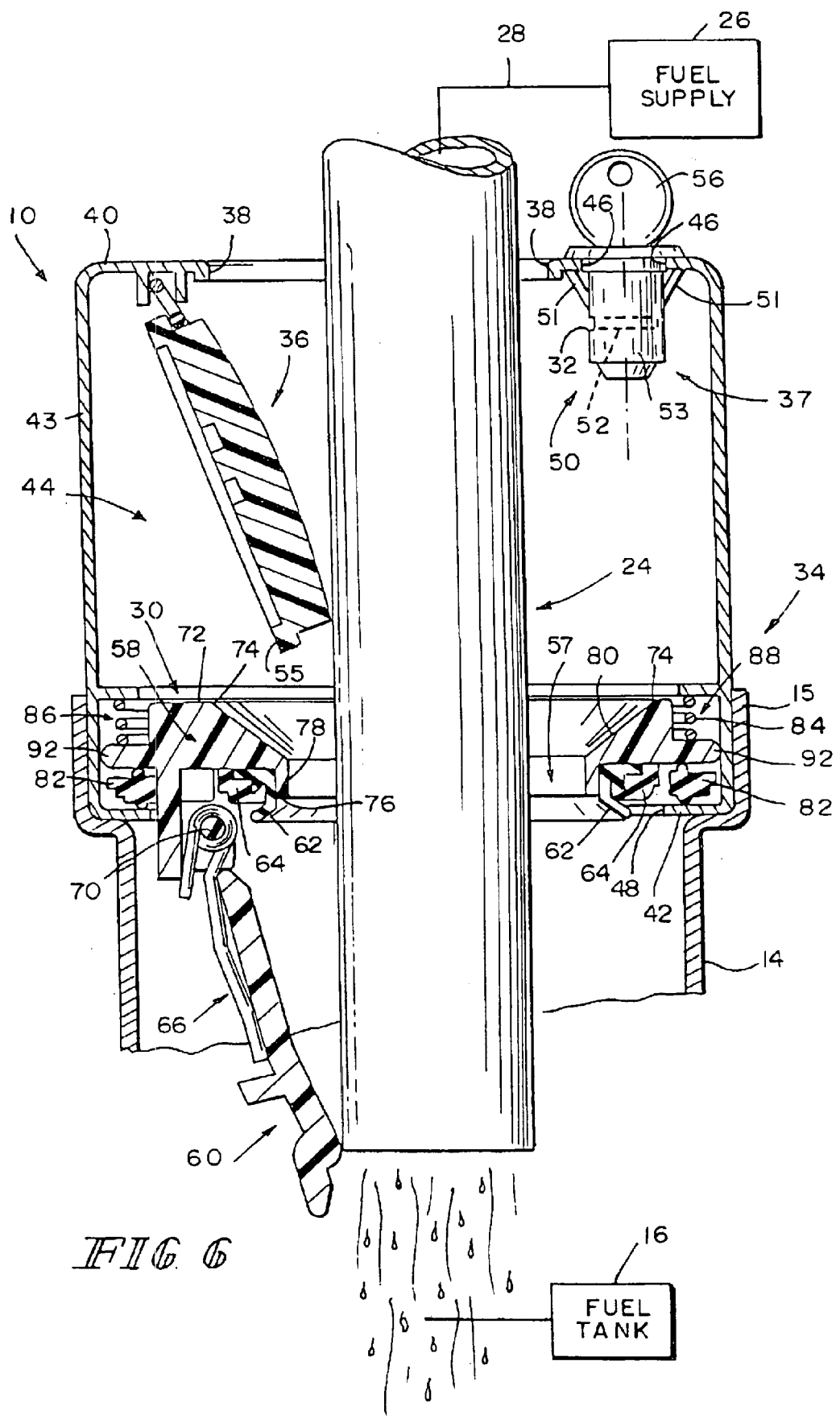
FIG. 6 is a sectional view similar to FIG. 5 showing movement of the pivotable dust shield to an opened position, insertion of the pump nozzle into the filler neck closure assembly, and discharge of liquid fuel from the pump nozzle into the filler neck during normal tank refueling.

Filler neck closure assembly 10 includes a nozzle receiver 30 sized to admit fuel-dispensing pump nozzle 24 therein during fuel tank refueling as suggested in FIG. 6. Filler neck closure assembly 10 further includes a filler neck closure housing 34 and a movable closure door or dust shield 36 mounted for movement relative to the housing 34 to open and close an outer aperture 38 that is formed in housing 34. A lock 37 of assembly 10 is associated with dust shield 36 and is movable between a locked position (as shown in FIGS. 2 and 3) to prevent dust shield 36 from opening and an unlocked position (as shown in FIGS. 4–6) to allow dust shield 36 to be opened so that nozzle 24 may enter nozzle receiver 30. A locked dust shield 36 prevents the introduction of contaminants into the filler neck 14 and secures the contents or gasoline within fuel tank 16 from theft.

In the illustrated embodiment, filler neck closure housing 34 is configured to be coupled to an outer end 15 of filler neck 14 to allow a fuel-dispensing pump nozzle 24 to pass through opened outer aperture 38 and the passageway formed in nozzle receiver 30 (when lock 37 is in the unlocked position) during fuel tank refueling as suggested in FIGS. 6. Housing 34 includes a top wall 40, a bottom wall 42 arranged to lie in spaced-apart relation to top wall 40, and a side wall 43 appended to a perimeter edge of top wall 40 and arranged to extend between top and bottom walls 40, 42 to define an interior region 44 of housing 34. Top wall 40 is formed to include outer aperture 38. Dust shield 36 is pivotally coupled to top wall 40 at door mount 41 to move from a closed position shown in FIG. 2 to an opened position shown in FIG. 6. An o-ring seal 45 is carried on dust shield 36 and arranged to mate with an edge of top wall 40 to establish a sealed connection between dust shield 36 and top wall 40 upon movement of dust shield 36 to the closed position. Top wall 40 is formed to include another outer aperture 46 for receiving a portion of lock 37 therein. In the illustrated embodiment, bottom wall 42 has an annular shape and is formed to include an inner aperture 48 opening into filler neck 14.

Figure 7:
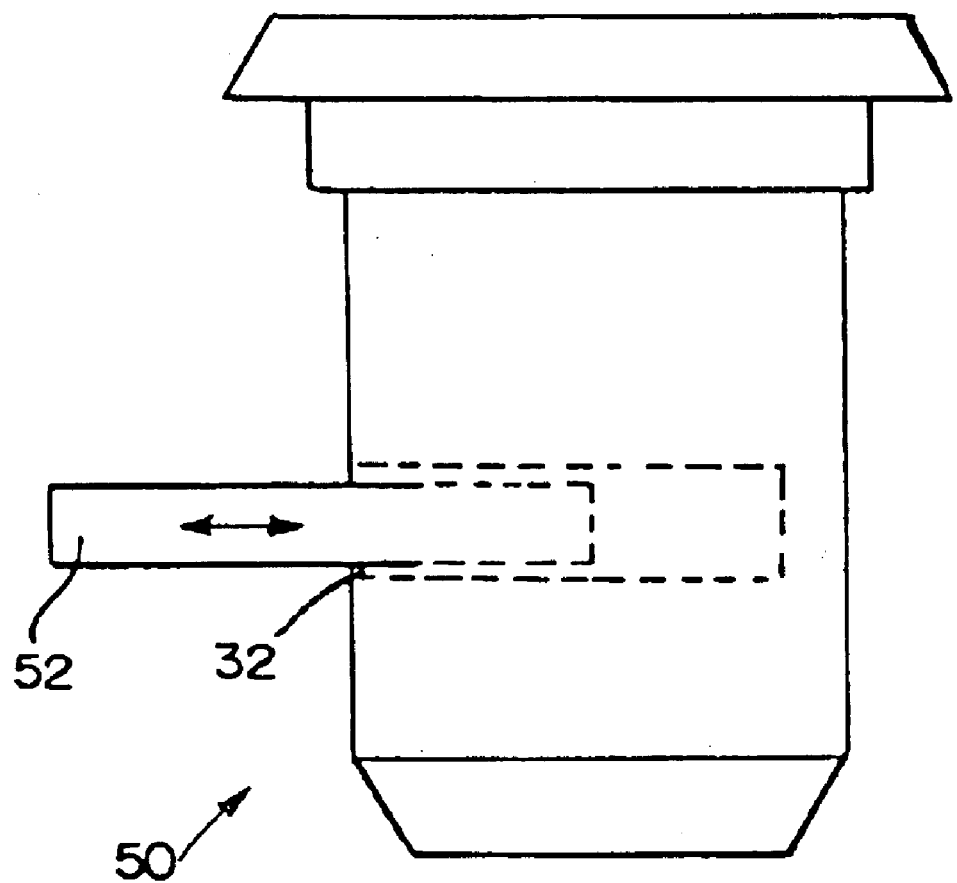
FIG. 7 is a side view of a telescoping lock blade.

Lock 37 includes a lock housing 50 coupled to top wall 40 of filler neck closure housing 34 and received, at least in part, through aperture 46 of top wall 40. Supports 51 of lock 37 are coupled to an outer wall 53 of housing 50 and top wall 40 of filler neck closure housing 34. A lock blade 52 of lock 37 moves relative to housing 50 between the locked position, as shown in FIGS. 2 and 3, and the unlocked position, as shown in FIGS. 4–6. Illustratively, lock blade 52 moves within a slot 32 formed in outer wall 53 of housing 50. Lock blade 52 pivots between the locked positioned (engaged with dust shield 36) and the unlocked position (disengaged from dust shield 36). Illustratively, lock blade 52 pivots about a vertical axis 49 through lock housing 50, as shown in FIG. 2. It is also within the scope of this disclosure for lock blade 52 to move between the locked and unlocked positions by other suitable means. For example, lock blade 52 may telescope (see FIG. 7) outwardly from housing 50 between a retracted position (disengaged from dust shield 36) and an extended position (engaged with dust shield 36), or lock blade 52 may move upwardly and downwardly between locked and unlocked positions.

As shown in FIG. 2, dust shield 36 is prevented from being opened when lock blade 52 is in the locked position. In the locked position, a top surface 54 of lock blade 52 engages a bottom surface 55 of dust shield 36. A lock actuator 56, illustratively a key, is provided to move lock blade 52 between the locked and unlocked positions, as is discussed in more detail below. Although illustrative lock actuator 56 is a key used to mechanically move lock blade between the locked and unlocked positions, it is within the scope of this disclosure to provide a lock actuator which moves the lock blade 52 via other suitable means such as electrically, magnetically, electromechanically, and/or remotely by for example, remote actuator 99 (see FIG. 1). For example, a switch located within vehicle 12, such as on the dashboard for example, may be pressed or engaged to remotely move lock 37 from the locked to the unlocked position. The lock 37 may also be remotely activated from a key transponder, for example.

Nozzle receiver 30 defines a nozzle-receiving passageway 57 as shown in FIGS. 2, 5, and 6 and a closure support 58 formed to include the pump nozzle-receiving passageway 652. A closure plate 60 of nozzle receiver 30 is mounted on closure support 58 for movement between a closed position closing pump nozzle-receiving passageway 57 a shown, for example, in FIGS. 2 and 5, and an opened position opening pump nozzle-receiving passageway 57 as shown, for example, in FIG. 6. Nozzle receiver 30 also includes an annular sealing gasket 62 fixed in place on closure support 58 by a retainer 64 and a torsion spring 66 coupled to closure support 58 and to closure plate 60 and configured to urge closure plate 60 in a counterclockwise direction 68 about a pivot pin 70 normally to engage annular sealing gasket 62 to close pump nozzle-receiving passageway 57 as shown, for example, in FIG. 2.

As shown best in FIGS. 5 and 6, closure support 58 includes an outer end 72 defining a large-diameter outer aperture 74 opening into pump nozzle-receiving passageway 57. Closure support 58 also includes an inner end 76 defining a small-diameter inner aperture 78 opening into pump nozzle-receiving passageway 57. A frustoconical inclined wall 80 extends from large-diameter outer aperture 74 to small-diameter inner aperture 78.

In the illustrated embodiment, nozzle receiver 30 cooperates with a sealing gasket 82 and a spring 84 to form a pressure-relief valve assembly 86 mounted for movement in a chamber 88 provided in interior region 44 of filler neck closure housing 34. Housing 34 includes a radially inwardly extending flange 90 positioned to lie in spaced-apart relation to annular bottom wall 42 to define chamber 88 therebetween as shown in FIG. 2.

An annular sealing plate 92 is included in closure support 58 and arranged to lie between annular flange 90 and annular bottom wall 42 as shown in FIG. 2. Sealing gasket 82 is positioned to lie between annular sealing plate 92 and annular bottom wall 42. Spring 84 is positioned to lie between annular flange 90 and annular sealing plate 92 and, in the illustrated embodiment, is a coiled compression spring. Spring 84 is configured to provide means for yieldably urging annular sealing plate 92 in downward direction 94 to engage sealing gasket 82 and maintain sealing gasket 82 in contact with annular bottom wall 42 to establish a liquid fuel and fuel vapor seal therebetween. When the pressure of fuel vapor in filler neck 14 exceeds a predetermined level, a lifting force is applied to nozzle receiver 30 to move annular sealing plate 92 upwardly to vent pressurized fuel vapor from filler neck 14. Reference is hereby made to U.S. Pat. No. RE 37,776, which is incorporated by reference herein, for a description of a suitable pressure-relief valve subassembly.

As mentioned above, filler neck closure housing 34 includes dust shield 36 and lock 37 associated with dust shield 36. Lock 37 includes lock blade 52, coupled to lock housing 50, which is movable between the locked position shown in FIGS. 2 and 3 and the unlocked position shown in FIGS. 4–6. Lock actuator, or key 56, is used to move lock blade 52 (and lock housing) between locked and unlocked positions, as shown in FIGS. 3 and 4. Lock housing 50 further includes a lock actuator receiver (not shown) for receiving a portion of lock actuator 56 therein so that lock blade 52 may be moved from the locked position to the unlocked position.

As shown in FIG. 3, lock blade 52 is in the locked position and lock actuator 56 (shown in phantom) is in a just-inserted position within lock housing 50. Counterclockwise rotation of lock actuator 56 from the position shown in FIG. 3 to that shown in FIG. 4 causes lock blade 52 attached thereto to also rotate in a counterclockwise direction to move lock blade 52 to the unlocked position disengaged from dust shield 36, as shown in FIG. 5. Illustratively, lock actuator 56 and lock blade 52 are moved about 90 degrees in the counterclockwise direction. Once lock blade 52 is in the unlocked position disengaged from dust shield 36, dust shield 36 may be moved to the opened position so that fuel-dispensing pump nozzle 24 may be inserted into nozzle receiver 30 through outer aperture 38 of filler neck closure housing 34, as shown in FIG. 6. After pumping fuel into fuel tank 16, for example, lock blade 52 may be rotated in a clockwise direction, by use of lock actuator 56, to return lock blade 52 to the locked position.

What is claimed is:

1. A filler neck closure assembly for a vehicle fuel tank filler neck, the assembly comprising:

a filler neck closure housing adapted to be coupled to the fuel tank filler neck and formed to include an outer aperture sized to receive a fuel-dispensing pump nozzle therein, a dust shield mounted for movement relative to the filler neck closure housing to open and close the outer aperture of the filler neck closure housing, and a lock coupled to the filler neck closure housing, the lock having a lock housing fixedly connected to the filler neck closure housing and a lock blade partially exterior to, supported by, and rotatable within the lock housing between a locked position to prevent the dust shield from opening the outer aperture and an unlocked position to allow the dust shield to open the outer aperture.

2. The assembly of claim 1, wherein the lock blade engages the dust shield when the lock is in the locked position and disengages with the dust shield when the lock in the unlocked position.

3. The assembly of claim 2, wherein the lock housing further includes a slot for receiving a portion of the lock blade therein, and wherein the lock blade is movable within the slot relative to the lock housing between engaged and disengaged positions.

4. The assembly of claim 3, further including a lock actuator adapted to be coupled to the lock to move the lock blade within the slot of the lock housing between the engaged and disengaged positions.

5. The assembly of claim 2, wherein the lock is positioned adjacent the dust shield and the lock blade rotates about a generally longitudinal axis along the lock housing between the locked and unlocked positions.

6. The assembly of claim 2, wherein the lock blade includes a top surface which engages a bottom surface of the dust shield when the lock is in the locked position.

7. The assembly of claim 1, wherein the filler neck closure housing includes a top wall formed to include the outer aperture and a side wall coupled to the top wall, and wherein the dust shield is coupled to the top wall to normally close the outer aperture of the top wall, and the lock is coupled to the top wall and received at least in part within another outer aperture of the top wall to lie adjacent the dust shield.

8. The assembly of claim 1, further including a lock actuator adapted to be coupled to the lock to move the lock between the locked position and the unlocked position.

9. The assembly of claim 1, further including a nozzle receiver having a plate adapted to open and close a passageway into the fuel tank filler neck.

10. A filler neck closure assembly for a vehicle fuel tank filler neck, the assembly comprising:

a nozzle receiver adapted to be coupled to a fuel tank filler neck to receive a fuel dispensing pump nozzle during fuel tank refueling, a filler neck closure housing enclosing at least a portion of the nozzle receiver, the filler neck closure housing including a top wall positioned to lie in spaced-apart relation to the nozzle receiver and a side wall arranged to extend between the top wall and the nozzle receiver to define an interior region of the filler neck closure housing, a dust shield coupled to the top wall of the filler neck closure housing for movement relative to the filler neck closure housing between an opened position to open an outer aperture of the filler neck closure housing and a closed position to close the outer aperture, a lock coupled to the top wall of the filler neck closure housing and movable relative to the filler neck closure housing between an engaged position engaged with the dust shield to prevent the dust shield from moving from the closed position to the opened position, and a disengaged position disengaged from the dust shield to allow the dust shield to move from the closed position to the opened position.

11. The assembly of claim 10, wherein the dust shield includes a top surface and a bottom surface, and wherein the lock is engaged with the bottom surface when the lock is in the engaged position.

12. The assembly of claim 11, wherein the dust shield includes a first end and a second end pivotally coupled to the top wall of the filler neck closure assembly, and wherein the lock engages the bottom surface of the first end of the dust shield when the lock is in the engaged position.

13. The assembly of claim 11, wherein the lock includes a lock housing coupled to the top wall and a lock blade coupled to the housing for movement relative to the housing between the engaged and disengaged positions.

14. The assembly of claim 13, wherein the lock housing includes a slot and the lock blade moves relative to the housing within he slot of the housing.

15. The assembly of claim 10, further including a lock actuator adapted to be coupled with the lock to move the lock between the engaged and disengaged positions.

16. The assembly of claim 10, wherein the nozzle receiver includes a plate adapted to open and close a passageway into the fuel tank filler neck.

17. A filler neck closure assembly for a vehicle fuel tank filler neck, the assembly comprising:

a filler neck closure housing adapted to be coupled to the filler neck of the vehicle and formed to include an outer aperture sized to receive a fuel-dispensing pump nozzle therein, a dust shield mounted for movement relative to the filler neck closure housing between an opened position to open the outer aperture of the filler neck closure housing and a closed position to close the outer aperture of the filler neck closure housing, and locking means for preventing the dust shield from moving to the opened position.

18. The assembly of claim 17, further including a nozzle receiver having a plate adapted to open and close a passageway into the fuel tank filler neck.

19. A filler neck closure assembly for a vehicle fuel tank filler neck, the assembly comprising:

a filler neck closure housing adapted to be coupled to the filler neck of the vehicle and formed to include an outer aperture sized to receive a fuel-dispensing pump nozzle therein, a dust shield mounted in the filler neck closure housing for movement relative to the filler neck closure housing between an opened position to open the outer aperture of the filler neck closure housing and a closed position to close the outer aperture of the filler neck closure housing, a lock able to limit movement of the dust shield, the lock being movable between a locked position to prevent the dust shield from moving to the opened position and an unlocked position to allow the dust shield to move to the opened position, and wherein the filler neck closure housing includes a top wall adapted to be spaced-apart from the filler neck of the vehicle, and wherein the outer aperture is formed in the top wall, and further wherein the filler neck closure housing includes another aperture formed in the top wall and the lock is received at least in part within the other aperture to position the lock adjacent the dust shield.

20. The assembly of claim 19, wherein the lock is coupled to the filler neck closure housing.

21. The assembly of claim 19, wherein the lock is engaged with a bottom surface of the dust shield when the lock is in the locked position and is disengaged with the dust shield when the lock is in the unlocked position.

22. The assembly of claim 19, further including a lock actuator configured to move the lock between the locked and unlocked positions.

23. The assembly of claim 22, wherein the lock actuator is adapted to be coupled to the lock to mechanically move the lock between the locked and unlocked positions.

24. The assembly of claim 22, wherein the lock actuator remotely actuates the lock to electrically move the lock between the locked and unlocked positions.

25. The assembly of claim 19, wherein the lock includes a lock blade movable between a locked position engaged with the dust shield, and an unlocked position disengaged from the dust shield.

26. The assembly of claim 25, wherein the lock blade pivots between the locked and unlocked positions.

27. The assembly of claim 25, wherein the lock blade telescopes between a retracted position disengaged from the dust shield and an extended position engaged with the dust shield.

* * * * *